(12) United States Patent
Boertjes et al.

(10) Patent No.: US 7,221,820 B2
(45) Date of Patent: May 22, 2007

(54) HIGH SPECTRAL EFFICIENCY, HIGH PERFORMANCE OPTICAL MUX AND DEMUX ARCHITECTURE

(75) Inventors: David W. Boertjes, Nepean (CA); Kim B. Roberts, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 72 days.

(21) Appl. No.: 10/473,799

(22) PCT Filed: Apr. 3, 2002

(86) PCT No.: PCT/CA02/00452

§ 371 (c)(1),
(2), (4) Date: Mar. 19, 2004

(87) PCT Pub. No.: WO02/082706

PCT Pub. Date: Oct. 17, 2002

(65) Prior Publication Data

US 2004/0151426 A1 Aug. 5, 2004

(51) Int. Cl.
G02B 6/28 (2006.01)
G02B 6/42 (2006.01)
H04J 14/00 (2006.01)
H04J 14/02 (2006.01)

(52) U.S. Cl. .................... 385/24; 385/27; 398/43; 398/48; 398/81

(58) Field of Classification Search ............... 385/24, 385/28; 398/43, 45, 81, 48, 56, 79, 147, 398/158
See application file for complete search history.

(56) References Cited

U.S. PATENT DOCUMENTS

| | | | |
|---|---|---|---|
| 5,602,666 A | 2/1997 | Ishikawa et al. | |
| 5,959,749 A | 9/1999 | Danagher et al. | |
| 6,005,702 A | 12/1999 | Suzuki et al. | |
| 6,084,694 A | 7/2000 | Milton et al. | |
| 6,169,616 B1 | 1/2001 | Cao | |
| 6,344,912 B1 | 2/2002 | Hajjar et al. | |
| 6,441,955 B1 | 8/2002 | Takatsu | |
| 6,445,850 B1 * | 9/2002 | Zhou et al. ............ | 385/24 |
| 6,493,117 B1 | 12/2002 | Milton et al. | |
| 6,519,060 B1 | 2/2003 | Liu | |
| 6,529,300 B1 | 3/2003 | Milton et al. | |
| 6,714,702 B2 * | 3/2004 | Whiteaway et al. ...... | 385/24 |
| 2002/0141693 A1 * | 10/2002 | Whiteaway et al. ...... | 385/24 |
| 2002/0186432 A1 | 12/2002 | Roorda et al. | |

* cited by examiner

*Primary Examiner*—Frank G. Font
*Assistant Examiner*—Charlie Peng
(74) *Attorney, Agent, or Firm*—Jeffrey M. Measures; Borden Ladner Gervais LLP

(57) ABSTRACT

The present invention discloses a high performance optical architecture for multiplexing and demultiplexing channels for use in high spectral efficiency optical systems. In general, the MUX and DeMUX architectures of the present invention will fall into two key sections or stages: a wavelength group section and a channel section. The group section makes use of characteristic associated with groups of multiplexed channels for separating said groups from an optical signal having a plurality of multiplexed groups. Advantageously, in preferred embodiments, the channel section is colorless (non-wavelength specific between groups) in order to reduce cost and complexity. With respect to the colorless channel section, components with free spectral ranges (FSRs) have been strategically added to provide repetitive optical filtering functions on group of channels (i.e., subsets of channels within each band of wavelengths) so that the colorless channel section can operate in any respective group identically. Hence each of said colorless channel sections are interchangeable. Advantageously Distortion compensation can be performed on a per group basis.

13 Claims, 6 Drawing Sheets

HIGH SPECTRAL EFFICIENCY, HIGH PERFORMANCE OPTICAL MUX AND DEMUX ARCHITECTURE

FIELD OF THE INVENTION

The present invention relates to the field of optical multiplexing and demultiplexing and, more particularly, to a high spectral efficiency, high performance optical multiplexer and demultiplexer architecture.

This application relates to an optical demultiplexing system and method Filed: Apr. 3, 2001 (the same day as the priority application for the present application), by James E. WHITEAWAY, Andrew J. COLLAR, and Stephen DAY, to be assigned to the assignee of the present application.

BACKGROUND OF THE INVENTION

Wavelength division multiplexing is a commonly used technique that allows the transport of multiple optical signals on an optical fiber. The ability to carry multiple signals on a single fiber allows that fiber to carry a tremendous amount of traffic, including data, voice, video, etc. By using wavelength division multiplexing it is possible to use a single fiber for multiple channels, as opposed to the costly process of installing additional fibers.

In wavelength division multiplexing (WDM), multiple channels are carried on different wavelengths within a specified optical band. It is advantageous to carry as much information as possible in this optical band. This is especially true for optical transmission systems which employ optical amplifiers to overcome the losses encountered during transmission. These amplifiers tend to have a fixed optical band in which they can perform amplification. Therefore, increasing the information carrying capacity of this optical band utilizes the amplifiers to their fullest extent.

The information capacity of an optical band can be increased by increasing the line-rate of the individual channels or decreasing the channel spacing in the optical band. The line-rate of the channel refers to the rate at which information is transmitted, e.g., the number of bits per second (B/s). An increased line rate causes the channel to occupy more optical spectrum. In contrast, decreasing the channel spacing decreases the amount of optical spectrum allotted to each channel. These competing effects can be described by the concept of spectral efficiency. Spectral efficiency is defined as the line-rate divided by the channel spacing and is usually expressed in units of bits per second per Hertz (B/s/Hz). For example, a system using a $10^9$ bits per second (1 GB/s) line-rate and a 100 GHz channel spacing would have a spectral efficiency of 0.1 B/s/Hz. It should be obvious that the spectral efficiency is a measure of the information carrying capacity of an optical band in that doubling the line-rate or halving the channel spacing results in twice the spectral efficiency and equivalently a system with twice the information carrying capacity.

The multiplexing and demultiplexing of optical channels is typically accomplished with wavelength selective optical filters. A conventional WDM multiplexer (MUX) and demultiplexer (DeMUX) employs a number of such filters, each filter adapted for passing one specific wavelength. Such conventional schemes are, therefore, disadvantageous in that multiple filters are required, adding to cost and complexity.

For example, in the classical "all-filter" approach the MUX and DeMUX are provided through a cascade of wavelength selective filters. This tends to result in the solution with the least amount of loss. However, there is a penalty in that the filters must have small bandwidths, smaller than the channel spacing because of the requirement to provide isolation and a second transmission path for adjacent channels. This tends to distort both the transmitted and adjacent channels both in amplitude and phase. The channel spacing can be increased to mitigate this optical filtering penalty, but the introduction of such 'dead-bands' decreases the spectral efficiency of the system making it less cost-effective.

Alternatively, using a power splitter and power combiner approach, the MUX and DeMUX are provided with the lowest filtering penalty but the highest loss. The MUX may be entirely wavelength insensitive while the DeMUX must have a stage of wavelength selective filtering. However, the amplitude and phase distortion of these filters is limited to the transmitted channel as adjacent channels are taken care of by the stages of power splitting. This requires many stages of power splitters and combiners which tends to increase the loss. For high channel count systems, therefore, this method becomes undesirable.

Separating and combining wavelengths in high spectral efficiency systems requires optical components which have high peak transmission over a relatively large bandwidth when compared to the channel spacing and which provide good isolation between closely spaced wavelengths. Therefore a method is needed for providing a MUX and DeMUX structure with reasonable loss and low filter penalty.

The issue of modularity has been addressed in the past by grouping wavelengths together to create a smaller number of wavelength dependent modules than the actual number of individual wavelengths. In general, wavelength specific modules tend to increase the number of modules that need to be developed and manufactured (affecting cost and time-to-market), marketed (decreasing the volume of the individual modules thereby increasing cost) and kept in inventory (both the vendor and the customer) for field replacement. Therefore it is advantageous to develop a solution which reduces the number of different modules required.

Furthermore, There is a need in optical transmission systems for optical add-drop multiplexing (OADM) at sites in the systems where traffic already exists on the optical fiber from different points of origin and having-different destinations. At these sites, it is also required to have access to add and drop traffic locally in a flexible manner. It is advantageous to reuse the same MUX and DeMUX architecture for this purpose thereby reducing the total number of different modules which would otherwise need to be developed. In addition, the use of the same modules for MUX, DeMUX, and OADM ensures the compatibility of the channel plan used for each purpose.

SUMMARY OF THE INVENTION

The present invention discloses a high performance optical architecture for multiplexing and demultiplexing channels for use in high spectral efficiency optical systems. In general, the MUX and DeMUX architectures of the present invention will fall into two key sections or stages: a wavelength group section and a channel section. Advantageously, in preferred embodiments, the channel section is colorless (non-wavelength specific between groups) in order to reduce cost and complexity.

With respect to the colorless channel section, components with free spectral ranges (FSRs) have been strategically added to provide repetitive optical filtering functions on groups of channels (i.e., subsets of channels within each band of wavelengths). Specifically, if the FSR of a device is chosen in such a way as to coincide with the spacing between groups, each group having a number of channels (N), then a module providing N unique optically filtered ports (having their operation wavelength offset from each other by the channel spacing) can be made "colorless" i.e. the module can operate in any respective group identically. Hence each of said colorless channel sections are interchangeable.

Optical amplifiers which work on groups of channels within the amplification band can be advantageously used to overcome the loss of power combiners and dispersion compensation elements when necessary. Furthermore, group dispersion compensators to pre/post compensate optical signals for both average dispersion and slope error of the transmission fiber can also be used when necessary.

One aspect of the invention provides a Multiplexer comprising a plurality of first power combining elements for combining individual wavelength channels into a plurality of channel groupings of predetermined width; a plurality of first coarse filters for multiplexing the plurality of channel groupings, each coarse filter multiplexing channel groupings of all odd parity or channel groupings of all even parity; a plurality of second power combining elements for combining the output of each first coarse filter of odd parity with the output of a corresponding first coarse filter of even parity to provide a plurality of outputs, each second power combining element output comprising a respective wavelength band corresponding to the channel groupings of each first coarse filter to which it is attached.

Another aspect of the invention provides a Demultiplexer comprising: a power splitter connected to a set of two second coarse filters; wherein each second coarse filter has a plurality of outputs for dividing an input optical signal into a plurality of channel groupings of predetermined width and outputting each channel grouping on a respective output; a plurality of filters of common design connected to respective outputs of each second coarse filter for demultiplexing optical signals into a plurality of individual wavelength channels; wherein the filters of common design have a plurality of configurations such that for each configuration a channel grouping of a specific parity is demultiplexed while channel groupings of opposite parity are rejected; and the configurations of the filters of common design are matched to the respective channel grouping outputs of each second coarse filter to which they are connected so that the filters of common design demultiplex the respective outputs of each second coarse filter into individual wavelength channels.

A broad aspect of the invention provides an optical optical node comprising:

a group-band component having a first plurality of group ports and a band port, wherein each of said group ports couples to a waveguide which carries a group of multiplexed channels, and wherein said band port couples to a waveguide which carries an optical signal having a plurality of multiplexed groups; a corresponding first plurality of group-channel components, each having a second plurality of channel ports and a group port, wherein each of said channel ports couples to a waveguide which carries a single channel, and wherein said group port couples to a waveguide which carries a group of multiplexed channels; and a first plurality of group dispersion compensation modules, each of said modules interposed between one of the group ports of said group-band component and the group port of a corresponding one of said group-channel components.

Another broad aspect of the invention provides an optical node comprising: a group-band component having a first plurality of group ports and a band port, wherein each of said group ports couples to a waveguide which carries a group of multiplexed channels, and wherein said band port couples to a waveguide which carries an optical signal having a plurality of multiplexed groups; a corresponding first plurality of group-channel components, each having a second plurality of channel ports and a group port, wherein each of said channel ports couples to a waveguide which carries a single channel, and wherein said group port couples to a waveguide which carries a group of multiplexed channels; and wherein said groups of multiplexed channels have an associated characteristic for separating said groups from an optical signal having a plurality of multiplexed groups and wherein said each of said corresponding first plurality of group-channel components are interchangeable.

It should be noted that each of these broad aspects can operate as either a Mulitplexer, De-multiplexer or both.

Another broad aspect of the invention provides a Demultiplexer comprising: a group-band demultiplexing means for separating an optical signal having a plurality of multiplexed groups into said multiplexed groups, wherein each group comprises multiplexed channels; a plurality of group-channel demultiplexing means for separating said multiplexed channels from each of said groups; wherein said groups of multiplexed channels have an associated characteristic for separating said groups from an optical signal having a plurality of multiplexed groups and wherein said plurality of group-channel demultiplexing means are colorless.

Yet another aspect of the invention provides a Demultiplexer comprising: a group-band demultiplexing means for separating an optical signal having a number of multiplexed groups into said multiplexed groups, wherein each group comprises multiplexed channels, and wherein said group-band demultiplexing means has said number of output ports;

said number of group-channel demultiplexing means for separating said multiplexed channels from each of said groups;

said number of group dispersion compensation means for providing dispersion compensation on a per group basis, each of said group dispersion compensation means interposed between one of said output ports of said group-band demultiplexing means and a corresponding one of said group-channel demultiplexing means.

The problem of optical filtering penalty is mitigated by the use of the MUX and DeMUX architectures of the present invention. Preferred embodiments of the present invention provide the opportunity to use optical modules with repetitive filter functions to create wavelength-independent modules which can operate in the system as if they had no wavelength dependence. This allows a reduction in the total number of optical modules developed which reduces development costs, reduces inventory complexity, reduces sparing requirements and increases per-unit volumes thereby reducing cost.

One advantage of using a two stage approach as described (i.e., a group stage and a channel stage) is these architectures provide a location for the compensation of chromatic dispersion on a per group basis (rather than on a per channel basis). Note this advantage holds true for embodiments which do not utilize a colorless channel stage. An advantage of using group compensators is this approach has the capability of overcoming the shortfall of wideband compensators in correcting for the slope of dispersion in transmission fiber, without requiring as many compensators as would be needed for a per channel approach.

Other aspects and features of the present invention will become apparent to those ordinarily skilled in the art upon review of the following description of specific embodiments of the invention in conjunction with the accompanying drawings.

DETAILED DESCRIPTION OF PREFERRED EMBODIMENTS

Figure 1:
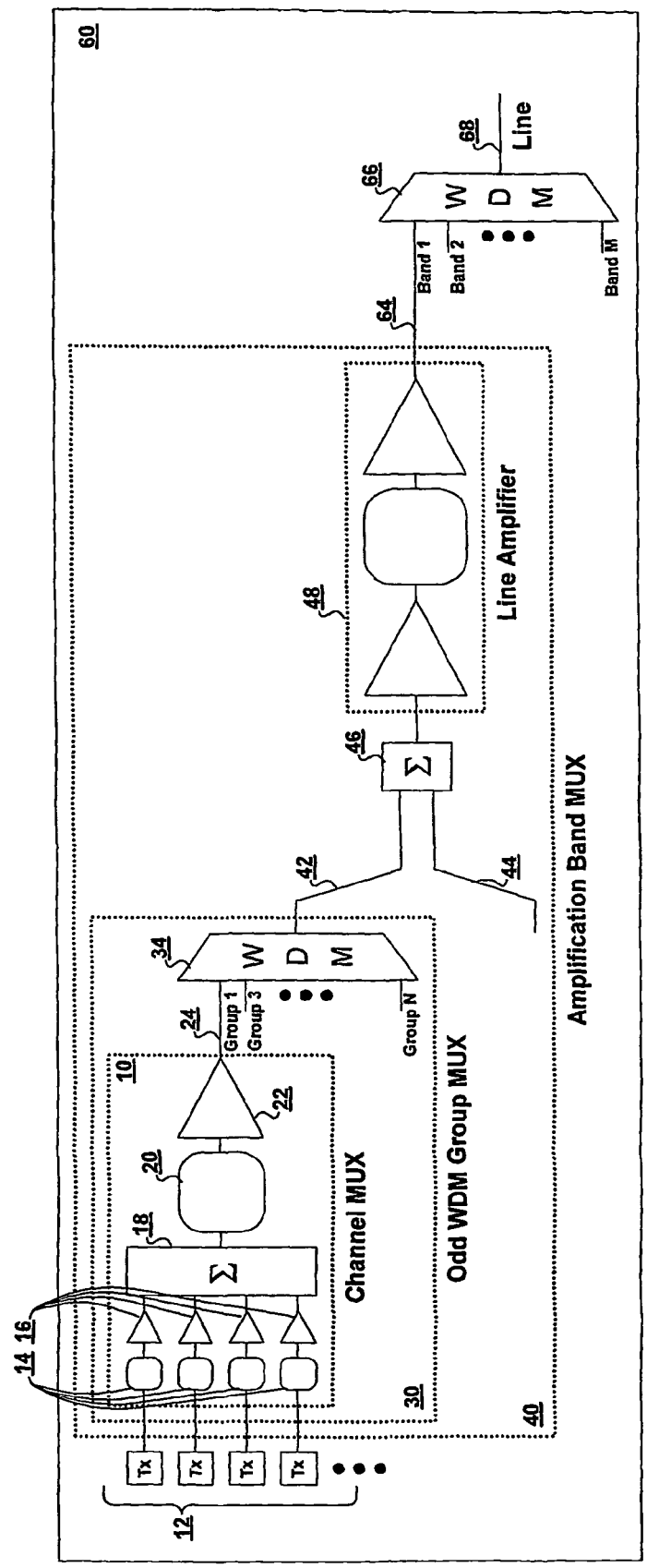
FIG. 1 illustrates a one embodiment of an optical MUX architecture according to the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The present invention provides a flexible, high-performance, optical multiplexer (MUX) and demultiplexer (De-MUX) architecture for high-bandwidth, high-spectral efficiency optically-amplified communications systems. A benefit of the present invention is that the proposed architectures provide for re-usable (i.e. non-wavelength specific) parts. This allows a reduction in the total number of optical modules developed which reduces development, manufacturing and installation costs, reduces inventory complexity, reduces sparing requirements, increases per-unit volumes and facilitates scalability.

One embodiment of the present invention provides increased usage of available optical amplification bands by eliminating the dead-bands common in previous systems (required by the filter topology and system architectures), and allows a closer channel spacing (such that the modulated spectral content of the channel uses more of the available bandwidth) while decreasing the narrowband filter impact.

A motivation underlying the present invention is to provide MUX and DeMUX functions for bands of wavelengths suitable for optical amplification in a fiber optic communication system while maximizing system performance and reach. In this respect, a multiple band system can be realized by replicating the soon-to-be described MUX and DeMUX architecture for each band independently. In general, the MUX and DeMUX architectures of the present invention will fall into two key sections: a wavelength group section and a channel section. In the wavelength group section, groups of multiplexed channels are separated from an from an optical signal having a plurality of multiplexed groups. These groups of multiplexed channels have an associated characteristic for separating said groups. In one embodiment of the invention, this characteristic is characteristic for separating groups comprises alternating groupings of odd or even parity. In a second embodiment, said characteristic for separating groups comprises an unused portion of optical spectrum between groups of channels (known as deadbands). In preferred embodiments, the channel sections are colorless. A colorless channel section implies that the channel sections are interchangeable between groups (i.e., non-wavelength specific between groups).

FIG. 1 is a schematic drawing showing the architecture of an optical multiplexer (MUX) 60 according to a first embodiment of the present invention. The multiplexer 60 consists of several stages: a Channel Mux 10, an odd WDM group MUX 30 and an amplification band MUX 40, each stage having been designed with a specific purpose in mind. At the input side, a plurality of transmitters TX is assumed each providing an optical signal on a unique wavelength channel.

In FIG. 1, a subset of the plurality of transmitters Tx forms a first WDM group 12 (in this case, 4 channels per WDM group) which feeds through a set of dispersion compensation elements 14 and a set of single channel amplifiers 16 and into a passive combiner 18. The output of the combiner 18 is connected to a WDM group dispersion compensation element 20 which then feeds into a WDM group amplifier 22. This arrangement of elements constitutes a first Channel Mux stage 10 of the optical MUX architecture. Generally, in any practical system, there will be a plurality of other Channel Muxs identical in structure to the Channel Mux 10, each Channel Mux corresponding to a unique WDM grouping of channels.

The output of the Channel Mux 10 is passed as an input to a WDM group filter 34 via line 24. The WDM group filter 34 will, in general, have a plurality of inputs, each particular input being derived from the output of a particular Channel Mux. In the particular arrangement shown in FIG. 1, the WDM group filter 34 is assumed to be fed an odd grouping of channels on each of its inputs i.e. the first input consists of group 1 comprising channels 1-4, the second input consists of group 3 comprising channels 9-12 and so on and so forth. In this manner, the WDM group filter 34 with each of its inputs connected to a respective Channel Mux comprises the odd WDM group MUX stage 30 of the optical MUX architecture of this embodiment of the present invention.

The output of the odd WDM group MUX 30 subsequently serves as one input to a power combiner 46 via line 42. A second input 44 to the power combiner 46 is derived from an even WDM group MUX (not shown) which will be identical in structure to the odd WDM group MUX 30, the only difference being that it will be concerned with all even groupings of channels (i.e. group 2 comprising channel 5-8, group 4 comprising channels 13-16 and so on and so forth). The output of the passive combiner 46 then feeds into a line amplifier 48. The arrangement comprising the odd WDM group MUX 30 and even WDM group MUX (not shown) connected to the passive combiner 46 and amplified by line amplifier 48 constitutes the amplification band MUX stage 40 in accordance with this embodiment of the present invention.

Finally, the output 64 of the amplification band MUX 40 in FIG. 1 constitutes one input to a band WDM (or interface filter) 66. In general, there may be M such amplification band MUXs each of whose output comprises an input to the band WDM 66 having output 68. The multiplexing of all M bands of wavelengths completes the architecture for the optical MUX 60 in accordance with this embodiment of the present invention.

As seen, the optical MUX architecture 60 of the present invention consists of several distinct stages. Referring to FIG. 1, the subset (or WDM grouping) 12 of transmitters Tx 12 are shown feeding into the Channel Mux 10. Each transmitter TX generates an optical signal carrying information on a unique wavelength (or frequency) channel. For each transmitter Tx in the subset 12, a corresponding dispersion compensation element 14 is provided on each channel independently to help achieve a desired dispersion vs. wavelength profile in order to mitigate the effects of slope error in the transmission fiber. To keep the compensation amount small and, therefore, the loss of the component small, a later set of dispersion compensation elements (e.g. WDM group dispersion compensation element 20) is provided across each channel grouping. For the particular embodiment of FIG. 1, there are 4 channels per WDM group. Those skilled in the art will appreciate that the set of dispersion compensation elements 14 are optional and may be implemented using dispersion compensating fibre (DCF) or fibre Bragg gratings (FBGs), among other technologies.

Following the set of dispersion compensation elements 14, the four channels of the WDM group 12 pass through the respective set of single channel amplifiers 16. The function of the single channel amplifiers 16 is to provide gain early on in the multiplexing process such that the noise impact of following stages is minimized, thereby maximizing the optical signal-to-noise ratio (OSNR). A secondary function is to provide the ability to perform equalization of channel powers. In this regard, the output channel powers can be limited by the WDM group dispersion compensation element 20 following the passive combiner 18. In terms of implementation, suitable technologies for implementation of the single channel amplifiers 16 include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

Subsequent to the set of single channel amplifiers 16, is the passive combiner 18. The function of the passive combiner 18 is basically to multiplex (MUX) a group of channels; in this case, the WDM group 12 of 4 adjacent channels on the chosen frequency grid. In general, there will be a passive combiner for each WDM grouping of channels. Some possible technologies for implementing the passive combiner 18 include fused fibre tapers, thin film dielectric couplers and waveguide couplers.

It should be noted here that the actual number of channels chosen to combine at this stage of the optical MUX architecture must balance several effects: loss, filter penalty for the following filter stages and noise accumulation. With regards to the first effect, each stage of a 2:1 combiner adds an intrinsic 3 dB loss which tends to favor a reduction in the size of the channel grouping. With respect to the second effect, as the group size is reduced the bandwidth of following filter stages is reduced. This, in turn, tends to drive up the amplitude and phase domain filter penalty induced at future filtering stages. This effect tends to warrant an increase in the group size. And lastly, any noise produced upstream from the combiner 18, from the set of transmitters Tx 12 or from the single channel amplifiers 16, can add into the optical bandwidth of any other channel. For each 2:1 combiner stage, therefore, there is a corresponding decrease in the optical signal-to-noise ratio (OSNR) of 3 dB. This last effect, then, tends to favor a decrease in the size of a channel grouping.

Following the passive combiner 18 is the WDM group dispersion compensation element 20. This element is provided to mitigate the effects of slope error in the transmission fiber. If the slope error is minor across a WDM group, it may be possible to omit the set single channel dispersion compensation elements 14 as previously alluded. In addition, to keep the compensation amount small (and therefore the loss of the component), a later dispersion compensation element (e.g. at the line amplifier 48) is provided across the entire band of channels. Some possible technologies for implementing the WDM group dispersion compensation element 20 include dispersion compensating fibre (DCF) or, fibre Bragg gratings (FBGs).

After passing through the WDM group dispersion compensation element 20, the resulting optical signal (in this case comprising the four multiplexed channels of the WDM group 12) is fed into the WDM group amplifier 22. The purpose of this amplifier is to provide gain to overcome losses to this point in the MUX architecture such that the noise impact of following sections is minimized, thereby maximizing the OSNR. A secondary function is to provide the ability to perform equalization of WDM group powers. This amplifier may not be necessary depending on the achievable output powers of the single channel amplifiers 16, and the losses downstream from this point to the next stage of optical amplification. Conversely, if the output powers of the Tx's is sufficient, it may be possible to omit the single channel amplifiers 16 in favor of using the WDM group amplifier 22. Furthermore, if the channel powers are sufficiently strong, both stages of amplification may be omitted. Technologies suitable for providing such amplification include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

The output of the Channel Mux 10 then serves as one input to the WDM group filter 34. In general, the WDM group filter 34 has a plurality of such inputs, each input being derived from the output of a corresponding Channel Mux. The WDM group filter 34 is used to multiplex every other WDM group (in this case group 1 comprising channels 1-4, group 3 comprising channels 9-12, group 5 comprising channels 17-20 etc.) where this subset of groups is named odd.

From an implementation perspective, there will be two such filter sets, one for the odd WDM group MUX 30 and one for the even WDM group MUX (not shown). The advantage in separating into odd and even groups is that the WDM group filter in any given set then sees what amounts to a 4-skip-4 channel plan. Advantageously, this permits relaxed filter specifications and also allows the bandwidth of the filter to increase such that the amplitude and phase domain distortions near the band edge do not fall within the passband of interest. Another advantage of this type of filtering is that it does not decrease the OSNR in the same way as the passive stages, and the insertion loss can be considerably less. This allows more ports to be cascaded in a single stage. Some examples of technologies which may be used for implementation of the WDM group filter 34 include thin film dielectric filters, fibre Bragg gratings and fused fibre tapers.

The output of the WDM group filter 34 (or the odd WDM group MUX 30) subsequently serves as one input to the passive combiner 46. As mentioned, the other input for the passive combiner 46 is derived from an even WDM group MUX (not shown). The role of the passive combiner 46 is basically to multiplex the even and odd groupings of channels to form a respective band of channels (or wavelengths). Technologies suitable for implementing the passive combiner 46 include fused fibre tapers, thin film dielectric couplers and waveguide couplers.

Alternatively, it may also be possible to use an interleaver type of filter function to combine the even and odd groupings of channels. However, performance issues arising from filter distortion would tend to require the introduction of dead-bands between the various groups. This is especially true for high spectral efficiency systems where the modulated spectral content of the channels takes up most or all of the bandwidth provided between channels.

Following the power combiner 46 is the line amplifier 48. This component reuses the conventional amplifier design typically used to amplify entire bands of channels between different fiber spans. While not strictly required, it is advantageous to reuse designs wherever possible to reduce cost and complexity. A traditional line amplifier typically requires a mid-stage access point for the purpose of dispersion compensation in its normal mode of operation. This particular application of the line amplifier 48 takes advantage of this fact to provide the bulk of the dispersion compensation required across the band of channels at this site. Examples of some technologies which may be used to implement the line amplifier 48 include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

The final stage of the optical MUX 60 architecture of this embodiment of the present invention is the band WDM (or Interface Filter) 66. In general, the band WDM 66 may have M inputs, each input being derived from the output of a corresponding amplification band MUX. The band WDM 66 is intended to MUX the different bands of amplified signals onto a single fiber for transmission. Therefore, this may be the same interface filter which would normally be used at a line amplifier site where each of a plurality of wavelength bands comprising an optical signal is first separated, amplified individually, and then combined back onto a single optical fiber for transmission. Examples of such amplification bands are the C-Band from 1526-1566 nm, the L-Band from 1569-1620 nm and the S-Band from 1445-1520 nm. Some possible technologies for implementing this final stage of the optical MUX include thin film dielectric filters, fibre Bragg gratings, and fused fibre tapers. Note this final stage is not necessary for single band systems.

Referring to FIG. 1, the dispersion compensation elements 14, the single channel amplifiers 16, the passive combiner 18, the WDM group dispersion compensation element 20 and the WDM group amplifier 22 have been grouped together into a module labeled the Channel Mux 10. Assuming that the amplifiers 16, 22 are designed to operate on any wavelength or group of wavelengths in the band of interest, there are no components which would naturally show any wavelength dependence in this module. It should be obvious that this generic module approach has advantages in reducing the number of filter variants needed to produce a system which, in turn, reduces development effort, reduces cost and reduces the number of modules which need to be kept on-hand for the purpose of sparing.

Figure 2:
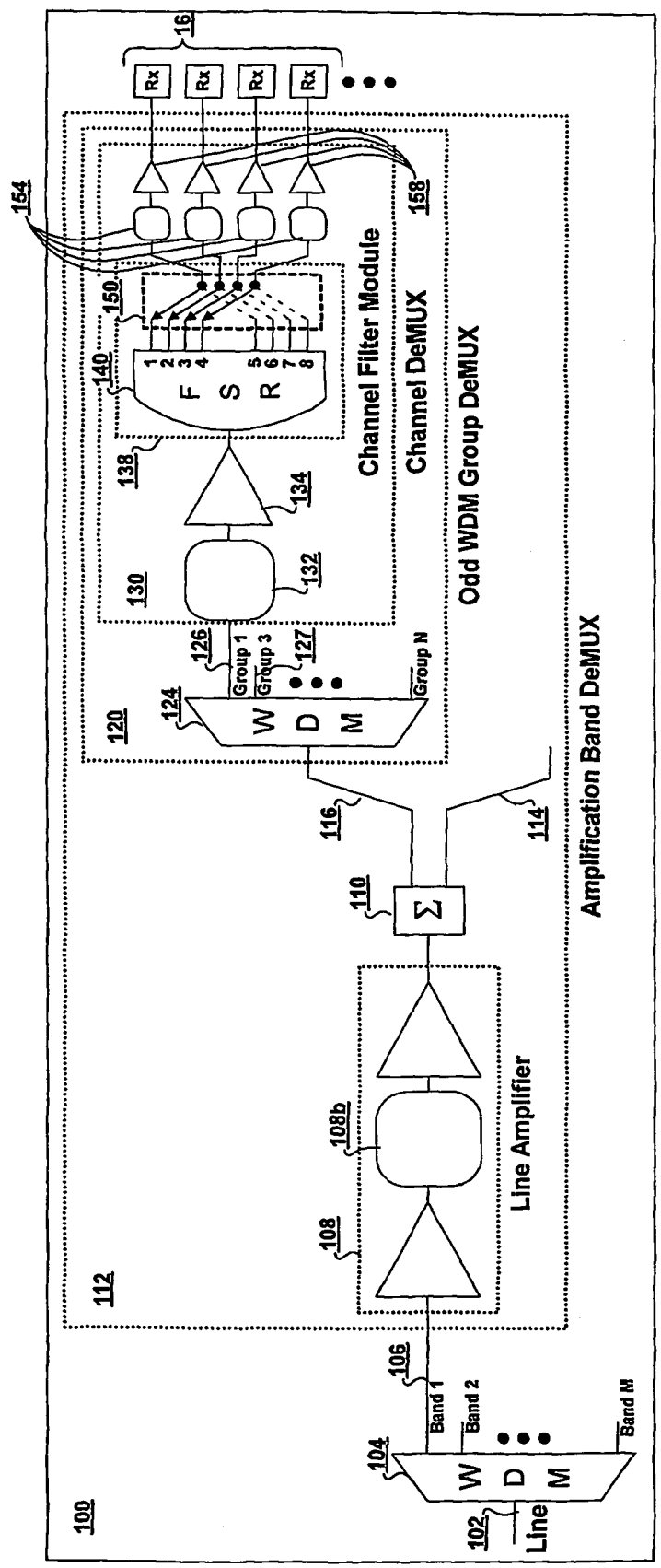
FIG. 2 illustrates a one embodiment of an optical DeMUX architecture according to the present invention.

FIG. 2 is a schematic drawing of an optical DeMUX 100 architecture according to an embodiment of the present invention.

The optical DeMUX 100 is comprised of several distinct stages: an amplification band DeMUX 112, an odd WDM group DeMUX 120, a WDM group DeMUX 130 and a channel DeMUX 138.

An optical signal to be demultiplexed enters a band WDM (or interface filter) 104. The band WDM 104 provides M unique outputs, in general, each output corresponding to a particular band of wavelengths. In FIG. 2, the demultiplexing of only one output 106 of the band WDM 104 is traced for the sake of simplicity. The first output 106 of the band WDM 104 is fed into a line amplifier 108 whose output is passed to a passive divider 110. Each output of the band WDM 104, therefore, is likewise fed into the respective line amplifier of a respective amplification band DEMUX. The passive divider 110 has an even output 114 and an odd output 116. In FIG. 2, the odd output 116 of the passive divider 110 feeds into an odd WDM group DeMUX 120. The even output 114 of the passive divider 110 feeds into a respective even WDM group DeMUX (not shown). The line amplifier 108, the passive divider 110, the odd WDM group DeMUX 120 and the even WDM group DeMUX comprise the amplification band DeMUX 112.

With respect to the odd WDM group DeMUX 12, the odd output 116 of the passive combiner 110 first feeds into a WDM group filter 124. The WDM group filter 124, in turn, provides a plurality of distinct outputs. As shown in FIG. 2, the first output 126 of the WDM group filter 124 feeds into a WDM group dispersion compensation element 132 of a first WDM group DeMUX 130. Similarly, each output of the WDM group filter 124 feeds into the WDM group dispersion compensation element of a corresponding WDM group DeMUX.

Looking at the WDM group DeMUX 130, the output of the WDM group dispersion compensation element 132 subsequently feeds into a WDM group amplifier 134. The output of the WDM group amplifier 134 then passes into the channel DeMUX 138. Specifically, the output of the WDM group amplifier 134 feeds into a free-spectral range (FSR) based DeMUX filter 140 which is designed to have as many outputs as required to accommodate two full WDM groups (in this case 8 channels to be consistent with FIG. 1). The outputs of the FSR-based DeMUX filter 140 are controlled by an optical switch function 150 having two distinct states so as to provide four outputs at any given time. A set of dynamic dispersion compensation elements 154 is provided subsequent to the optical switch function 15. Following the set of dynamic dispersion compensation elements 154 is a respective set of single channel amplifiers 158 whose outputs are passed to a corresponding set of receivers 160.

In terms of function, the band WDM 104 is provided to DeMUX optical signals arriving from a single transmission fiber into different bands of amplified signals. In general, the optical signal may be separated into M unique wavelength bands. This is indicated in FIG. 2 by the band WDM 104 having M distinct outputs. Typically, the band WDM 104 will be the same type of interface filter normally used at line amplifier sites where each of a number of wavelength bands are first separated, amplified individually, and then combined back onto a single fiber for transmission. Some possible technologies for implementing this first stage of the optical DeMUX 100 architecture include thin film dielectric filters, fiber Bragg gratings and fused fiber tapers.

As seen in FIG. 2, the first output 106 of the band WDM 104 is supplied to the line amplifier 108 of the amplification band DeMUX 112. The line amplifier 108 reuses the conventional amplifier design typically used in the art to amplify an entire band of channels between fiber spans. Specifically, mid-stage access is provided in order to provide for the inclusion of a dispersion compensation element 108b. As was the case for the optical MUX 60, the present application takes advantage of this mid-stage access to provide the bulk of the dispersion compensation required across each particular wavelength band at this site. While not strictly required, it is advantageous to reuse designs whenever possible to reduce cost and effort. Some suitable technologies for implementation of the line amplifier 108 include erbium doped fiber amplifiers (EDFAs), other rare-earth doped fiber amplifiers, semiconductor optical amplifiers (SOAs), erbium doped waveguide amplifiers (EWFAs), other rare-earth doped waveguide amplifiers and lumped Raman amplifiers.

Following the line amplifier 108 is the passive divider 110. This is the same device as the passive combiner 46 in FIG. 1 except that it is used in the opposite direction. The passive divider 110 is used provide optical power to both the odd WDM group DeMUX 120 and the even WDM group DeMUX (not shown). The passive divider 110 presents the entire band of channels (i.e. both odd and even groups) to each of the following filtering stages. Possible technologies for implementing the passive divider 110 include fused fibre tapers, thin film dielectric couplers and waveguide couplers.

Alternatively, it is conceivable to use an interleaver type of filter function to distribute the wavelength groups between the odd and even WDM group DeMUXs. However, as is the case for the optical MUX 60 of FIG. 1, performance issues arising from filter distortion would tend to require the introduction of dead-bands between the various channel groupings. Furthermore, as will be seen shortly in relation to the channel DeMUX 130, the following stages of the optical DeMUX render it unnecessary to provide such a DeMUX function at this stage of the DeMUX 100 architecture.

Considering the odd WDM group DeMUX 120, the odd output 116 of the passive divider 110 is first passed to the WDM group filter 124. The role of the WDM group filter is to separate the plurality of multiplexed groups within the optical signal. In this embodiment, the characteristic for separating groups comprises alternating groupings of odd or even groups Thus, the odd WDM group filter 124 DeMUXes every other WDM group (in this case group 1 comprising channels 1-4, group 3 comprising channels 9-12, group 5 comprising channels 17-20, etc.) where the subsets of groups are named odd and even respectively. In general, there will be two of these filter sets; one for the odd WDM group DeMUX 120 and one for an even WDM group DeMUX (not shown). Advantageously, the WDM group filter 124 may be of the same design as used in the optical MUX 60 of FIG. 1 (i.e. WDM group filter 34) thereby providing for the reuse of components. The benefit of relaxed filter specifications is thereby exploited to this end. For the particular DeMUX embodiment depicted in FIG. 2 with M distinct bands, there will be Mx2 WDM group filters in total i.e. two for each respective band.

The primary function of the WDM group filter 124 is to provide the appropriate WDM channel grouping to down-stream stages while providing suppression on channels in adjacent WDM groups of the same parity (odd or even). This, of course, assumes that a passive divider has been used in the previous stage of filtering. It is allowable that vestiges of adjacent channels belonging to groups of opposite parity to the group of interest be presented to down-stream stages, for reasons which will soon be apparent.

Figure 3:
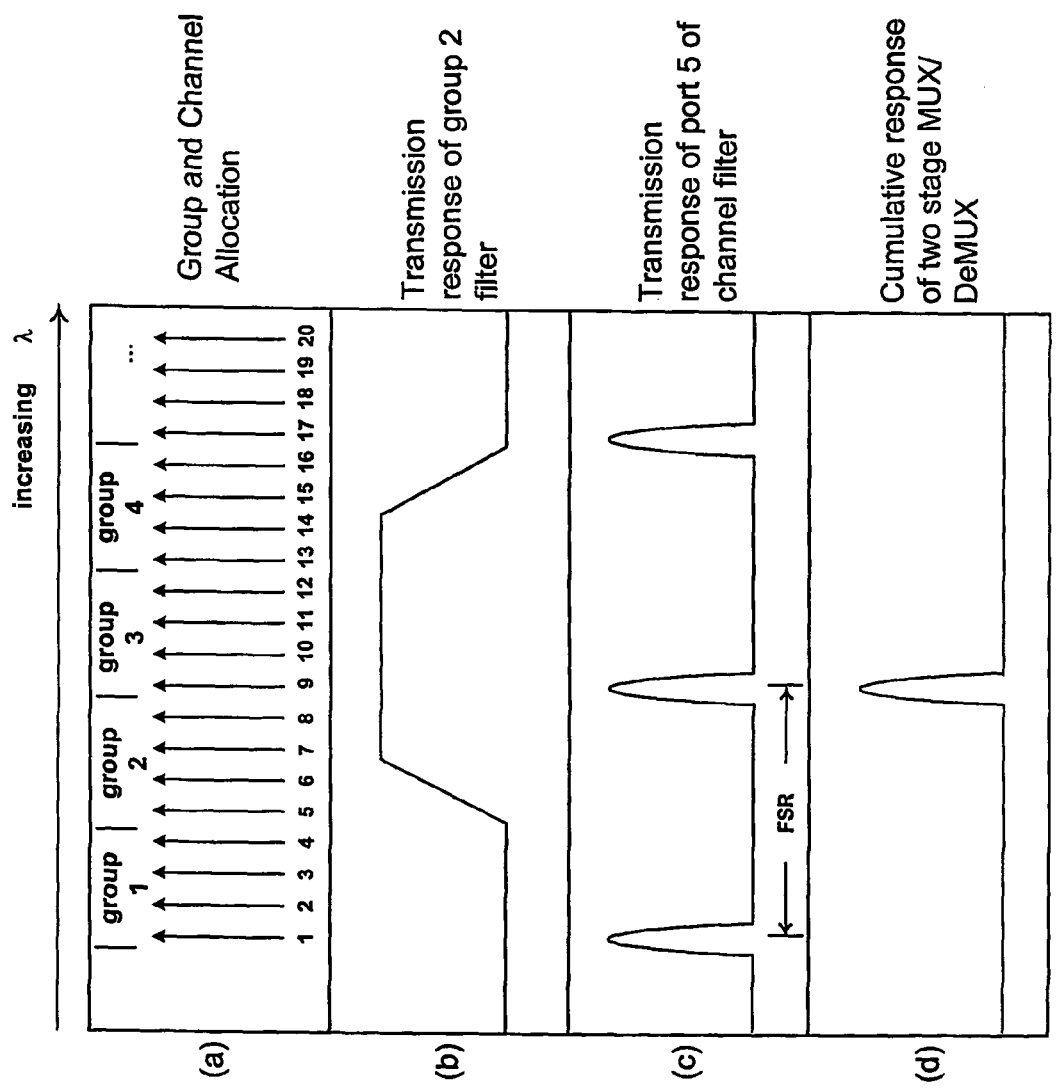
FIG. 3 illustrates the channel and group allocation and the resulting optical filtering responses at several locations corresponding to the embodiments of the optical MUX and DeMUX architectures as shown in FIGS. 1 and 2.

Consider FIG. 3b which depicts an example of a filter function corresponding to the WDM group filter 124 in FIG. 2. The WDM group filter 124 is adapted to select the group of channels numbered 9, 10, 11, and 12, as shown in FIG. 3a, on its second output 127. As shown by the filter function in FIG. 3b, the WDM group filter 124 also presents the FSR-based DeMUX filter 140 a vestige of channels from adjacent groups of opposite parity, i.e. channels 5, 6, 7, 8 and channels 13, 14, 15, 16. All other channels are substantially blocked on this output. In general, each output of the WDM group filter 124 will have an associated filter function passing a characteristic group of channels to a respective WDM group DeMUX. Possible technologies for implementation of the WDM group filter 124 include thin film dielectric filters, fibre Bragg gratings and fused fibre tapers.

Referring back to FIG. 2, the first output 126 of the WDM group filter 124 is passed to the WDM group dispersion compensation element 132 of the WDM group DeMUX 130. The WDM group dispersion compensation element 132 is provided here to mitigate the effects of slope error in the transmission fiber. To keep the compensation amount small (and therefore the loss of the component), an earlier dispersion compensation element 108b was provided across the entire band of channels. Note that if the slope error is minor across a particular WDM group, it may be possible to omit the single channel dispersion compensators 154 to be discussed below. In any case, some examples of technologies which may be used to implement the WDM group dispersion compensation element 132 are dispersion compensating fibre (DCF) and fibre Bragg gratings (FBGs).

Following the WDM group dispersion compensation element 132 is the WDM group amplifier 134. The purpose of this amplifier is to provide gain to overcome losses to this point in the DeMUX architecture such that the noise impact of following sections is minimized (thereby maximizing OSNR). A secondary function is to provide the ability to perform equalization of WDM group powers. The WDM group amplifier 134 is optional and may not be necessary depending on the achievable output power from the line amplifier 108, and the losses downstream from this point to the next stage of optical amplification. Some example technologies for implementation of the WDM group amplifier 134 include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

The final stage in the DeMUX 100 architecture is the channel DeMUX module 138. This stage is crucial to the proper operation of the entire DeMUX architecture 100. The channel DeMUX 138 consists of two parts: the free spectral range (FSR) based DeMUX filter 140 and the optical switch function 150. The FSR-based DeMUX filter 140 is designed to have an FSR equal to that of two full WDM groups. In the particular embodiment of FIG. 2, the FSR spans 8 wavelength channels since there are four channels per WDM group. Accordingly, the FSR-based DeMUX filter 140 is designed to DeMUX all eight possible channels within its FSR.

Consider now FIG. 3c which depicts the characteristic filter functions corresponding to the first output port of the FSR-based DeMUX filter 140, namely port 1. It is seen that the filter function repeats itself in each order of the device spaced one FSR (i.e. 8 channels) apart. Referring to FIG. 3a, output port 1 is capable of collecting power from channels 1, 9, and 17 as well as other channels from other orders not shown. However, since it is the function of the WDM group filter 124 to substantially block all light from unwanted groups of the same parity of the group of interest, the only light presented at output port 1 of the FSR-based DeMUX filter 140 is from channel number 9 as shown in FIG. 3d. Output ports 2 through 4 of the FSR-based DeMUX filter 140 operate in exactly the same manner.

Output ports 5 through 8 of the FSR-based DeMUX filter 140 are slightly different, however, in that each of these ports will present the sum of two wavelength channels. Referring to FIG. 3a, for example, output port 5 will present the sum of channels 5 and 13. Further to the function of the FSR-based DeMUX filter 140, it is the purpose of the optical switch function 150 to select the appropriate set of output channels (channels 1 through 4 for the channel DeMUX 138 in the embodiment of FIG. 2), and to ensure that the unwanted channels (in this case on ports 5 through 8) are terminated appropriately.

In accordance with the present invention, the optical switch function 150 is designed to have two distinct states, one which chooses an odd grouping of channels (such as group 1 comprising channels 1, 2, 3 and 4) and terminates the unwanted even grouping of channels, and one that chooses an even group of channels and terminates the unwanted odd group of channels. Advantageously, this allows the same module to be used as either an odd WDM group DeMUX or an even WDM group DeMUX. The only difference between the two modules will be the setting of the switch states. Secondly, the FSR-based filter 140 acts equivalently in any order of operation. Therefore, the same device can be used at any group output of the WDM group filter 124. In terms of implementation, some possible technologies for implementing the FSR-based DeMUX filter 140 include arrayed waveguide gratings (AWGs), etalon-based devices and holographic gratings. For the optical switch function 150, possible implementation technologies may include opto-mechanical switches, waveguide switches, fibre Mach-Zehnder switches, MEMS switches and electro-absorptive switches, to name a few.

In FIG. 2, the outputs supplied by the optical switch function 150 (in this case corresponding to ports 1 through 4 of the FSR-based DeMUX filter 140) are passed into the set of dynamic dispersion compensation elements 154. As previously alluded, these elements are optional and may be provided on each channel independently, in order to achieve a needed dispersion target to mitigate the effects of slope error, temperature variation in the transmission fiber (which causes changes in chromatic dispersion), optical component changes in the system etc. Some example technologies suitable for implementing the dynamic dispersion compensation elements 158 include dispersion compensating fibre (DCF) and fiber Bragg gratings (FBGs).

Subsequent to the set of dynamic dispersion compensation elements 154 is a set of single channel amplifiers 158. The purpose of the single channel amplifiers 158 is quite simple. They are to provide suitable gain to the demultiplexed channels (i.e. the four channels corresponding to output ports 1 through 4 of the FSR-based DeMUX filter 140 in FIG. 2) prior to detection at the receivers 160 such that the thermal noise impact of following stages is minimized. A secondary function is to provide the opportunity to perform equalization of channel powers. The single channel amplifiers 158 may be implemented using any suitable technology including, but not limited to, erbium doped fiber amplifiers (EDFAs), other rareearth doped fiber amplifiers, semiconductor optical amplifiers (SOAs), erbium doped waveguide amplifiers (EWFAs), other rareearth doped waveguide amplifiers and lumped Raman amplifiers.

The optical MUX 60 and DeMUX 100 architectures of the present invention provide multiplexing and demultiplexing functions for bands of wavelengths suitable for amplification in a fiber optic communication system while maximizing system performance and reach. In general, a multiple band system may be realized by replicating the described MUX 60 and DeMUX 100 architectures for each of M bands, respectively. In addition, the generic module approach of each of the MUX and DeMUX architectures is advantageous in that the number of filter variants needed to produce a system is reduced which, in turn, reduces development effort, reduces cost and reduces the number of modules which need to be kept on-hand for the purpose of sparing. Furthermore, chromatic dispersion is typically compensated for in the art on a channel-by-channel basis. This is more costly and bulky than the approach of the present invention which can compensate on a group basis.

The present invention mitigates the problem of optical filtering penalty generally associated with the classical all-filtering approach to multiplexing and demultiplexing. The MUX 60 and DeMUX 100 architectures disclosed also provide multiple locations for the compensation of chromatic dispersion, thereby overcoming the shortfall of wideband compensators in correcting for the slope of dispersion in transmission fiber.

Figure 4:
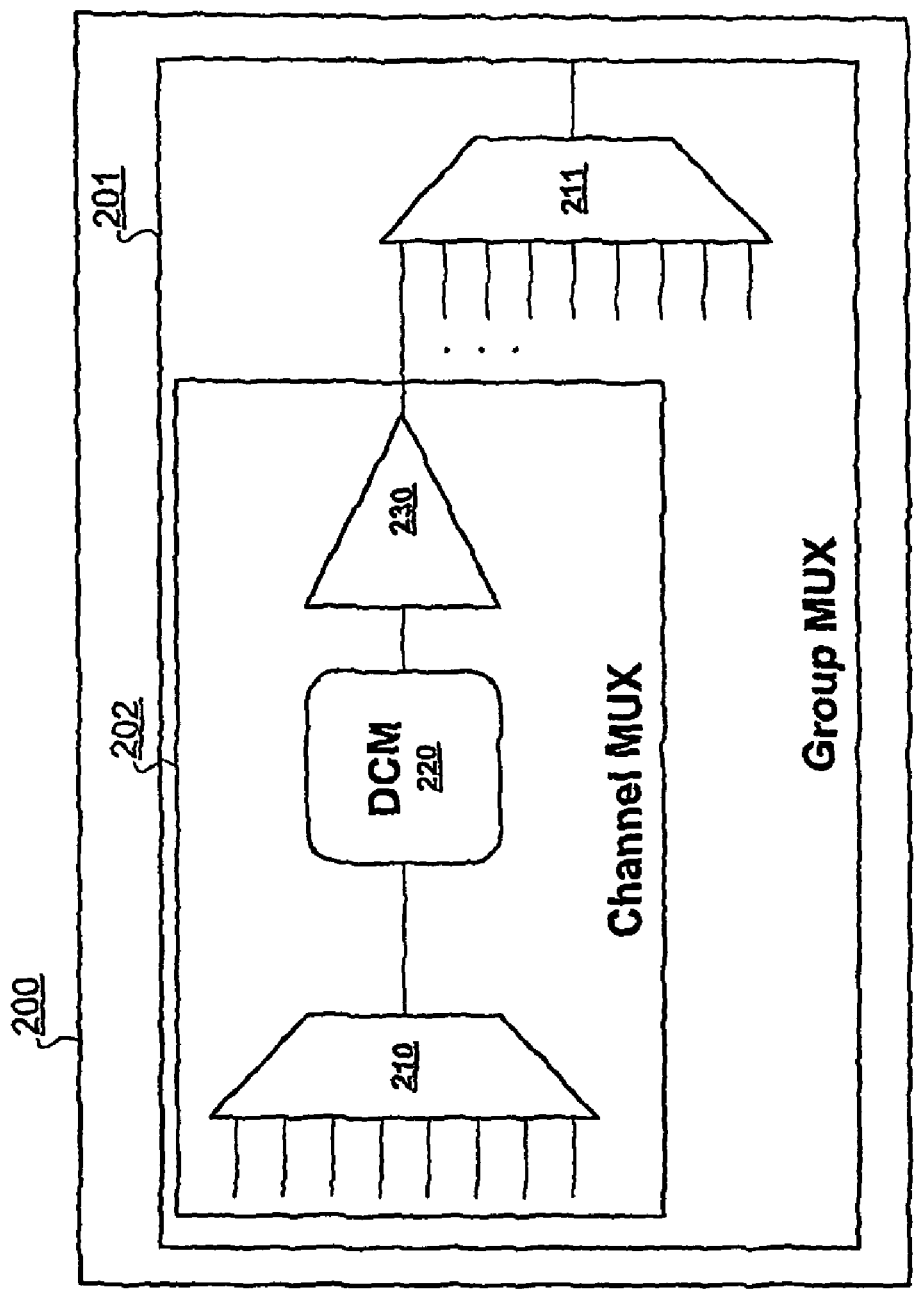
FIG. 4 illustrates a second embodiment of an optical MUX architecture according to the present invention.

In another embodiment of the invention, the characteristic for separating groups comprises an unused portion of optical spectrum between groups of channels called dead-bands. Introducing dead-bands between groups of channels has the advantage of allowing reuse of portions of the MUX and DeMUX architecture as needed for the purposes of optical add-drop multiplexing (OADM). FIG. 4 is a schematic drawing showing the architecture of an optical multiplexer (MUX) 200 according to this second embodiment of the present invention. The multiplexer 200 consists of several stages: a colorless channel MUX 202, and WDM group MUX 201, each stage having been designed with a specific purpose in mind. At the input side, a plurality of transmitters TX is assumed each providing an optical signal on a unique wavelength channel.

In FIG. 4, a subset of the plurality of transmitters Tx forms a first WDM group (in this case, 8 channels per WDM group) which feeds into a passive combiner 210. The output of the combiner is connected to a WDM group dispersion compensation element 220 which then feeds into a WDM group amplifier 230. This arrangement of elements constitutes a first Channel MUX stage 202 of the optical MUX architecture. Generally, in any practical system, there will be a plurality of other WDM group MUXs identical in structure to the Channel MUX 202, each Channel MUX corresponding to a unique WDM grouping of channels.

The output of the Channel MUX 202 is passed as an input to a WDM group filter 211. The WDM group filter 211 will, in general, have a plurality of inputs, each particular input being derived from the output of a particular Channel MUX. In the particular arrangement shown in FIG. 4, the WDM group filter 211 is assumed to have an input for all channel groups which are to be used. This is in contrast with the MUX 60 in FIG. 1 in which the WDM group filter 34 was designed to operate on a subset of groups with odd parity. In this manner, the WDM group filter 211 with each of its inputs connected to a respective Channel MUX comprises the WDM Group MUX stage 201 of the optical MUX architecture of the present invention.

As seen, the optical MUX architecture 200 of the present invention consists of two distinct stages. Referring to FIG. 4, the subset (or WDM grouping) of transmitters Tx are assumed to be feeding into the Channel MUX 202. Each transmitter Tx generates an optical signal carrying information on a unique wavelength (or frequency) channel. For clarity, the channel-by-channel dispersion compensation and amplification elements which were introduced in the previous embodiment are omitted in this embodiment. Dispersion compensation elements (e.g. WDM group dispersion compensation element 220) are provided across each channel grouping. For the particular embodiment of FIG. 4, there are 8 channels per WDM group. Those skilled in the art will appreciate that the dispersion compensation elements 220 are optional and may be implemented using dispersion compensating fibre (DCF) or fibre Bragg gratings (FBGs), among other technologies.

The eight channel of the WDM group are presented to the inputs of the FSR-based MUX filter 210. The function of the FSR-based MUX filter 210 is basically to multiplex (MUX) a group of channels; in this case, the WDM group of 8 adjacent channels on the chosen frequency grid. In general, there will be an FSR-based MUX filter for each WDM grouping of channels. Advantageously, the FSR-based MUX filter 210 maybe of the same design as used in the optical Demux 300 in FIG. 5, i.e., the FSR-based Demux filter 213. Some possible technologies for implementing the FSR-based MUX filter 210 include arrayed waveguide gratings (AWGs), etalon-based devices and holographic gratings.

It should be noted here that the actual number of channels chosen to combine at this stage of the optical MUX architecture must balance several effects: loss and filter penalty for the following filter stages.

Following the FSR-based MUX filter 210 is the WDM group dispersion compensation element 220. This element is provided to mitigate the effects of slope error in the transmission fiber. To keep the compensation amount small (and therefore the loss of the component), a later dispersion compensation element may be provided across the entire band of channels, e.g. at the line amplifier following the MUX 200 (not shown). Some possible technologies for implementing the WDM group dispersion compensation element 220 include dispersion compensating fibre (DCF) or, fibre Bragg gratings (FBGs).

After passing through the WDM group dispersion compensation element 220, the resulting optical signal (in this case comprising the eight multiplexed channels of the WDM group) is fed into the WDM group amplifier 230. The purpose of this amplifier is to provide gain to overcome losses to this point in the MUX architecture such that the noise impact of following sections is minimized, thereby maximizing the OSNR. A secondary function is to provide the ability to perform equalization of WDM group powers. This amplifier may not be necessary depending on the achievable output powers of the transmitters, and the losses downstream from this point to the next stage of optical amplification. Technologies suitable for providing such amplification include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

The output of the Channel MUX 202 then serves as one input to the WDM group filter 211. In general, the WDM group filter 211 has a plurality of such inputs, each input being derived from the output of a corresponding WDM group MUX. The WDM group filter 211 is used to multiplex all WDM groups.

From an implementation perspective, since there is only one such filter set, the channel plan must be set with what amounts to an m-skip-n channel plan such that the amplitude and phase domain distortions near the band edge do not fall within the passband of interest, for example 8-skip-2. Some examples of technologies which may be used for implementation of the WDM group filter 211 include thin film dielectric filters, fibre Bragg gratings and fused fibre tapers.

Referring to FIG. 4, the FSR-based filter 210, the WDM group dispersion compensation element 220 and the WDM group amplifier 230 have been grouped together into a module labelled the Channel MUX 202. Assuming that the amplifier 230 is designed to operate on any wavelength or group of wavelengths in the band of interest, there are no components which would naturally show any wavelength dependence in this module. It should be obvious that this generic module approach has advantages in reducing the number of filter variants needed to produce a system which, in turn, reduces development effort, reduces cost and reduces the number of modules which need to be kept on-hand for the purpose of sparing.

Figure 5:
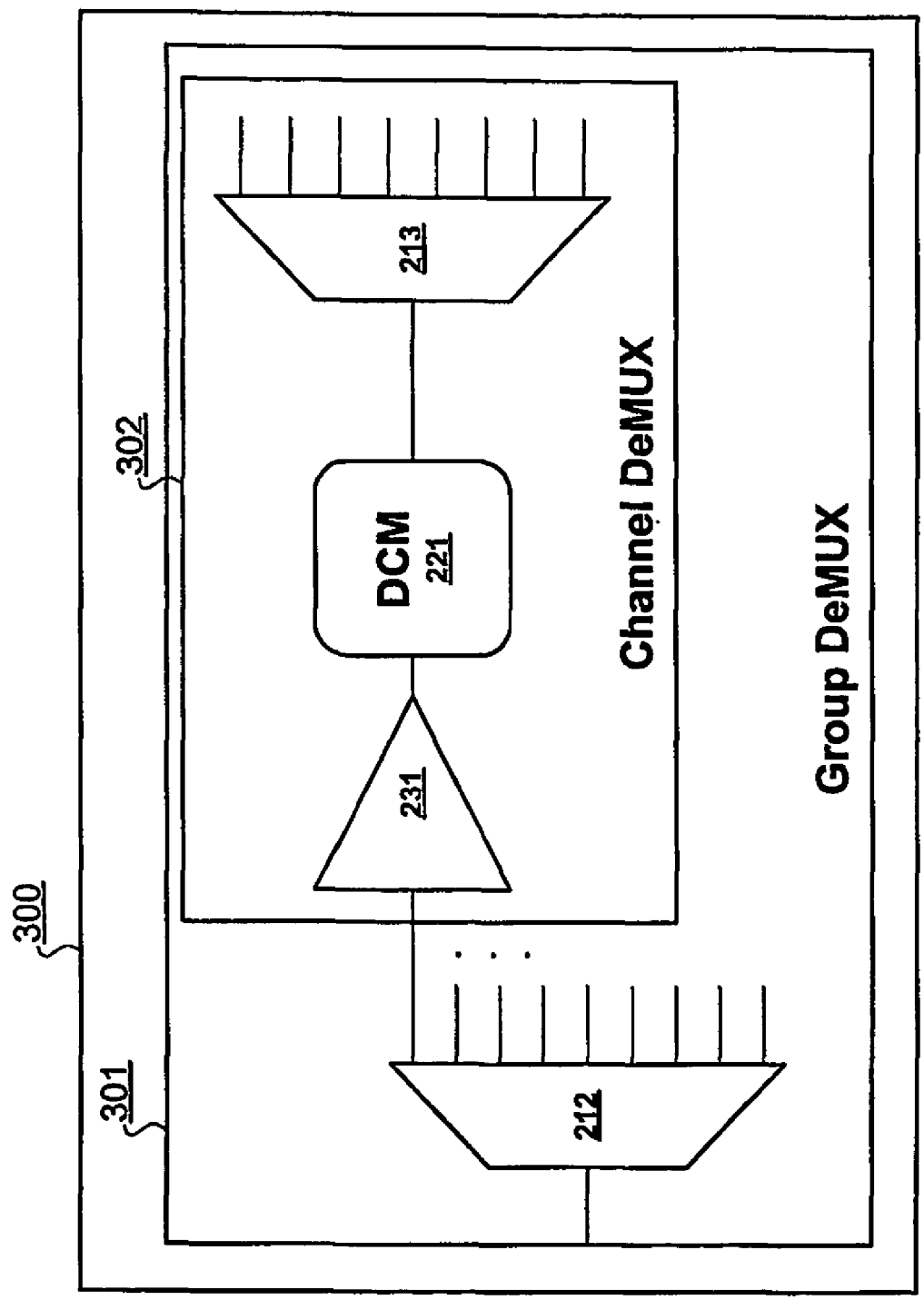
FIG. 5 illustrates a second embodiment of an optical DeMUX architecture according to the present invention.

FIG. 5 is a schematic drawing of an optical DeMUX 300 architecture according a second embodiment of the invention. The optical DeMUX 300 is comprised of several distinct stages: a WDM group DeMUX 301 and a Channel DeMUX 302.

An optical signal to be demultiplexed enters a WDM group DeMUX 301. The WDM group DeMUX 301 is comprised of a WDM group filter 212. The WDM group filter 212, provides a plurality of distinct outputs. As shown in FIG. 5, the first output of the WDM group filter 212 feeds into a WDM group dispersion compensation element 221 of a first Channel DeMUX 302. Similarly, each output of the WDM group filter 212 feeds into the WDM group dispersion compensation element of a corresponding Channel DeMUX.

Looking at the Channel DeMUX 302, the output of the WDM group dispersion compensation element 221 subsequently feeds into a WDM group amplifier 231. The output of the WDM group amplifier 231 then passes into the free-spectral range (FSR) based DeMUX filter 213 which is designed to have as many outputs as required to accommodate one full WDM group (in this case 8 channels to be consistent with FIG. 4). The outputs of the FSR-based DeMUX filter 213 do not require an optical switch as was shown in FIG. 2 and are fed to a corresponding set of receivers.

In terms of function, the input of the WDM group DeMUX 301 is first passed to the WDM group filter 212. The role of the WDM group filter 212 filter is to DeMUX all other WDM groups. Advantageously, the WDM group filter 212 may be of the same design as used in the optical MUX 200 of FIG. 4 (i.e. WDM group filter 211) thereby providing for the reuse of components. The benefit of relaxed filter specifications is thereby exploited to this end.

The primary function of the WDM group filter 212 is to provide the appropriate WDM channel grouping to down-stream stages while providing suppression on channels in adjacent WDM groups. In this embodiment, it is not allowable that vestiges of channels belonging to adjacent groups to the group of interest be presented to down-stream stages, for reasons which will soon be apparent.

Figure 6:
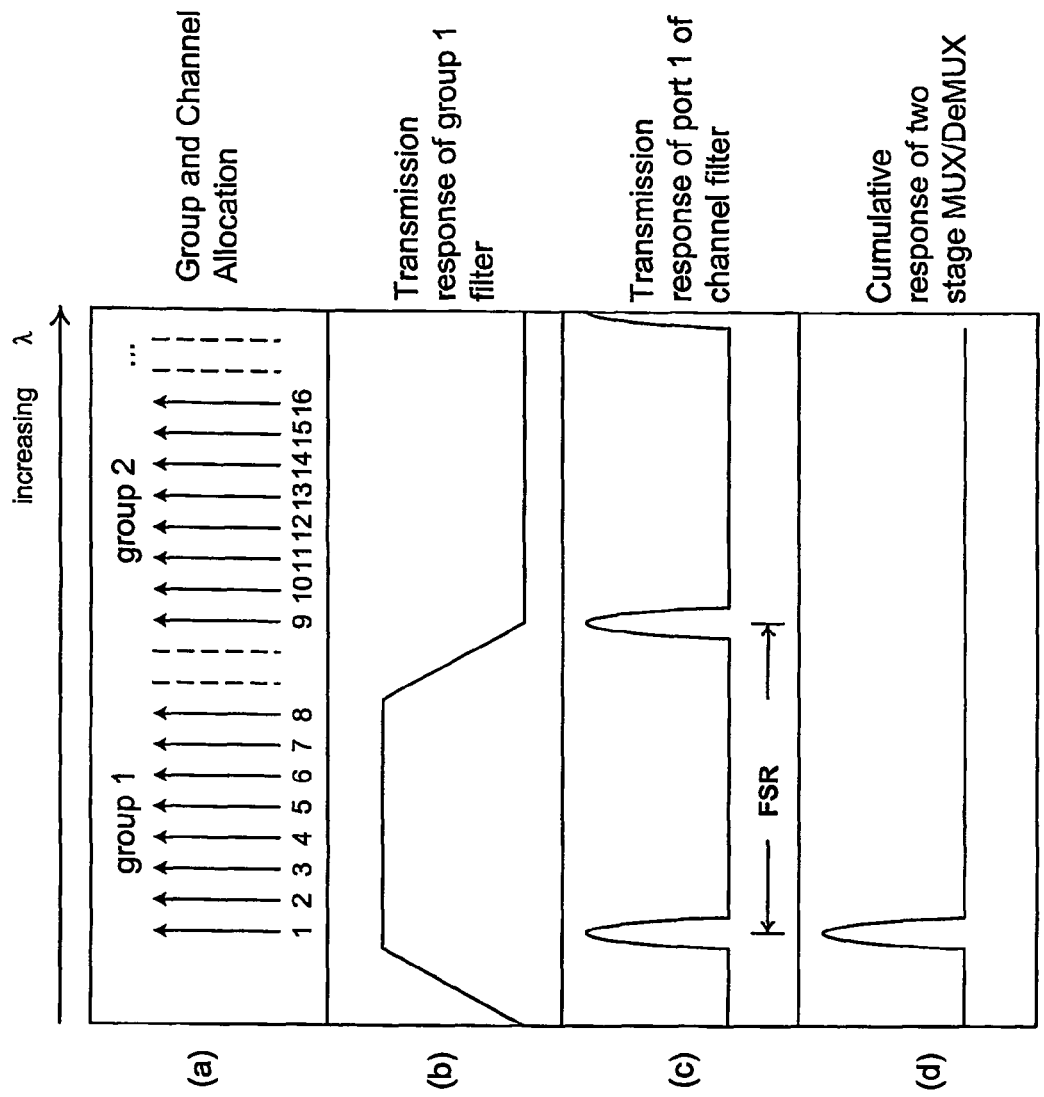
FIG. 6 illustrates the channel and group allocation and the resulting optical filtering responses at several locations corresponding to the embodiments of the optical MUX and DeMUX architectures as shown in FIGS. 4 and 5.

Consider FIG. 6b which depicts an example of a filter function corresponding to the WDM group filter 212 in FIG. 5. The WDM group filter 212 is adapted to select the group of channels numbered 1, 2, 3, 4, 5, 6, 7, and 8, as shown in FIG. 6*a*, on its first output. As shown by the filter function in FIG. 6*b*, the WDM group filter 212 also substantial suppression of channels from adjacent groups, i.e. channels 9, 10, 11, 12, 13, 14, 15, and 16. All other channels are substantially blocked on this output as well. In general, each output of the WDM group filter 212 will have an associated filter function passing a characteristic group of channels to a respective Channel DeMUX. Possible technologies for implementation of the WDM group filter 212 include thin film dielectric filters, fibre Bragg gratings and fused fibre tapers.

Referring back to FIG. 5, the first output of the WDM group filter 212 is passed to the WDM group dispersion compensation element 221 of the Channel DeMUX 302. The WDM group dispersion compensation element 221 is provided here to mitigate the effects of slope error in the transmission fiber. To keep the compensation amount small (and therefore the loss of the component), an earlier dispersion compensation element may provided across the entire band of channels (not shown). Some examples of technologies which may be used to implement the WDM group dispersion compensation element 221 are dispersion compensating fibre (DCF) and fibre Bragg gratings (FBGs).

Following the WDM group dispersion compensation element 221 is the WDM group amplifier 231. The purpose of this amplifier is to provide gain to overcome losses to this point in the DeMUX architecture such that the noise impact of following sections is minimized (thereby maximizing OSNR). A secondary function is to provide the ability to perform equalization of WDM group powers. The WDM group amplifier 231 is optional and may not be necessary depending on the achievable channel powers entering the DeMUX 300, and the losses downstream from this point to the receiver. Some example technologies for implementation of the WDM group amplifier 231 include erbium doped fiber amplifiers (EDFAs), other rare-earth doped fiber amplifiers, semiconductor optical amplifiers (SOAs), erbium doped waveguide amplifiers (EWFAs), other rare-earth doped fiber amplifiers and lumped Raman amplifiers.

The final stage in the DeMUX 300 architecture is the free spectral range (FSR)-based DeMUX filter 213. The FSR-based DeMUX filter 213 is designed to have an FSR equal to that of one full WDM groups. In the particular embodiment of FIG. 5, the FSR spans 8 wavelength channels since there are 8 channels per WDM group. Accordingly, the FSR-based DeMUX filter 213 is designed to DeMUX all eight possible channels within its FSR.

Consider now FIG. 6*c* which depicts the characteristic filter functions corresponding to the first output port of the FSR-based DeMUX filter 213, namely port 1. It is seen that the filter function repeats itself in each order of the device spaced one FSR (i.e. 10 channels for the 8-skip-2 channel plan) apart. Referring to FIG. 6*a*, output port 1 is capable of collecting power from channels 1, and 9 as well as other channels from other orders not shown. However, since it is the function of the WDM group filter 212 to substantially block all light from unwanted groups, the only light presented at output port 1 of the FSR-based DeMUX filter 213 is from channel number 1 as shown in FIG. 6*d*. Output ports 2 through 8 of the FSR-based DeMUX filter 213 operate in exactly the same manner. Advantageously, this allows the same module to be used in any WDM group equivalently since the FSR-based filter 213 acts equivalently in any order of operation. Therefore, the same device can be used at any group output of the WDM group filter 212. In terms of implementation, some possible technologies for implementing the FSR-based DeMUX filter 213 include arrayed waveguide gratings (AWGs), etalon-based devices and holographic gratings.

The optical MUX 200 and DeMUX 300 architectures of the present embodiment provide multiplexing and demultiplexing functions for bands of wavelengths suitable for amplification in a fiber optic communication system while maximizing system performance and reach. In general, a multiple band system may be realized by replicating the described MUX 60 and DeMUX 300 architectures for each of M bands, respectively. In addition, the generic module approach of each of the MUX and DeMUX architectures is advantageous in that the number of filter variants needed to produce a system is reduced which, in turn, reduces development effort, reduces cost and reduces the number of modules which need to be kept on-hand for the purpose of sparing. Furthermore, chromatic dispersion is typically compensated for in the art on a channel-by-channel basis. This is more costly and bulky than the approach of the present invention which can compensate somewhat arbitrary sized sub-bands of the amplification band of interest.

The present invention mitigates the problem of optical filtering penalty generally associated with the classical all-filtering approach to multiplexing and demultiplexing. The MUX 200 and DeMUX 300 architectures disclosed also provide multiple locations for the compensation of chromatic dispersion, thereby overcoming the shortfall of wide-band compensators in correcting for the slope of dispersion in transmission fiber Most importantly, the architectures of the present invention provide the opportunity to re-use optical modules with repetitive filter functions to create wavelength-independent modules which can operate within a system as if they had no wavelength dependence. Advantageously, the introduction of such non-wavelength specific modules allows for a reduction in the total number of filtering modules that need to be developed for a particular system. This, in turn, reduces development costs, reduces inventory complexity, reduces sparing requirements, increases time-to-market and increases per-unit volumes thereby reducing cost.

To summarize, the optical MUX and DeMUX architectures of the present invention attempt to minimize a host of system penalties attributable to wavelength dependent chromatic dispersion error (i.e. slope error), filtering penalties due to amplitude and phase domain distortions, maximization of optical signal-to-noise ratio (OSNR), channel equalization etc. This is achieved through the appropriate combinations of wavelength independent power combiners/dividers (i.e. passive elements), wavelength selective MUX or DeMUX filters (i.e. filter stages), fixed and dynamically adjustable narrow band chromatic dispersion compensation elements, and narrowband optical amplifiers. The architectures of the present invention have been described with reference to the specific embodiments in FIGS. 1 and 2 which embody the spirit of the invention, but by no means should such a description be taken as exhaustive of all the options available.

While preferred embodiments of the invention have been described and illustrated, it will be apparent to those skilled in the art that numerous modifications, variations and adaptations may be made without departing from the scope of the invention as defined in the claims appended hereto.

The invention claimed is:

1. An optical node comprising:
   a group-band component having a first plurality of group ports and a band port, wherein each of said group ports couples to a waveguide which carries a group of multiplexed channels, and wherein said band port couples to a waveguide which carries an optical signal having a plurality of multiplexed groups;

a corresponding first plurality of group-channel components, each having a second plurality of channel ports and a group port, wherein each of said channel ports couples to a waveguide which carries a single channel, and wherein said group port couples to a waveguide which carries a group of multiplexed channels; and a first plurality of group dispersion compensation modules, each of said modules interposed between one of the group ports of said group-band component and the group port of a corresponding one of said group-channel components;

wherein said groups of multiplexed channels have an associated characteristic for separating said groups from an optical signal having a plurality of multiplexed groups and wherein each of said corresponding first plurality of group-channel components operate identically for each group of multiplexed channels.

2. An optical node as claimed in claim 1 wherein said node is a Demultiplexer and wherein said corresponding first plurality of group-channel components provide repetitive optical filtering functions on groups of channels.

3. Demultiplexer as claimed in claim 2 wherein said characteristic for separating groups comprises an unused portion of optical spectrum between groups of channels.

4. Demultiplexer as claimed in claim 2 wherein said characteristic for separating groups comprises alternating groupings of odd or even parity.

5. Demultiplexer as claimed in claim 3 wherein the first plurality of group-channel components has a free spectral range (FRS), which to coincides with the spacing between groups, each group having a number of channels (N), and wherein each of the first plurality of group-channel components comprises N unique optically filtered ports having their operation wavelength offset from each other by the channel spacing.

6. An optical node as claimed in claim 1 wherein said node is a multiplexer.

7. An optical node comprising: a group-band component having a first plurality of group ports and a band port, wherein each of said group ports couples to a waveguide which carries a group of multiplexed channels, and wherein said band port couples to a waveguide which carries an optical signal having a plurality of multiplexed groups; a corresponding first plurality of group-channel components, each having a second plurality of channel ports and a group port, wherein each of said channel ports couples to a waveguide which carries a single channel, and wherein said group port couples to a waveguide which carries a group of multiplexed channels; and wherein said groups of multiplexed channels have an associated characteristic for separating said groups from an optical signal having a plurality of multiplexed groups and wherein each of said corresponding first plurality of group-channel components are colorless.

8. An optical node as claimed in claim 7 wherein said node is a Demultiplexer and wherein said corresponding first plurality of group-channel components provide repetitive optical filtering functions on groups of channels.

9. A Demultiplexer as claimed in claim 8 wherein said characteristic for separating groups comprises an unused portion of optical spectrum between groups of channels.

10. A Demultiplexer as claimed in claim 8 wherein said characteristic for separating groups comprises alternating groupings of odd or even parity.

11. A Demultiplexer as claimed in claim 10 wherein the first plurality of group-channel components has a free spectral range (FRS), which to coincides with the spacing between groups, each group having a number of channels (N), and wherein each of the first plurality of group-channel components comprises N unique optically filtered ports having their operation wavelength offset from each other by the channel spacing.

12. An Demultiplexer as claimed in claim 4 wherein the FSR of the first plurality of group-channel components is chosen in such a way as to coincide with the spacing between groups of the same parity, each group having a number of channels (N), and wherein each of of the first plurality of group-channel components comprises 2N unique optically filtered ports (having their operation wavelength offset from each other by the channel spacing).

13. An Demultiplexer as claimed in claim 10 wherein the FSR of the first plurality of group-channel components is chosen in such a way as to coincide with the spacing between groups of the same parity, each group having a number of channels (N), and wherein each of of the first plurality of group-channel components comprises 2N unique optically filtered ports (having their operation wavelength offset from each other by the channel spacing).

* * * * *

UNITED STATES PATENT AND TRADEMARK OFFICE
CERTIFICATE OF CORRECTION

PATENT NO. : 7,221,820 B2  
APPLICATION NO. : 10/473799  
DATED : May 22, 2007  
INVENTOR(S) : David W. Boertjes et al.

It is certified that error appears in the above-identified patent and that said Letters Patent is hereby corrected as shown below:

Column 20, line 21, claim 11, delete "10" and insert therefor --9--.

Signed and Sealed this

Sixth Day of November, 2007

JON W. DUDAS  
*Director of the United States Patent and Trademark Office*